(12) United States Patent
Kobayashi et al.

(10) Patent No.: US 7,957,120 B2
(45) Date of Patent: Jun. 7, 2011

(54) CAPACITOR CHIP AND METHOD FOR MANUFACTURING SAME

(75) Inventors: Kenki Kobayashi, Tokyo (JP); Eiji Komazawa, Tokyo (JP); Tomoya Utashiro, Tokyo (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 522 days.

(21) Appl. No.: 12/097,338

(22) PCT Filed: Dec. 14, 2006

(86) PCT No.: PCT/JP2006/324901
§ 371 (c)(1),
(2), (4) Date: Jun. 13, 2008

(87) PCT Pub. No.: WO2007/069670
PCT Pub. Date: Jun. 21, 2007

(65) Prior Publication Data
US 2009/0290292 A1    Nov. 26, 2009

Related U.S. Application Data

(60) Provisional application No. 60/752,045, filed on Dec. 21, 2005.

(30) Foreign Application Priority Data

Dec. 15, 2005   (JP) .................... 2005-361966

(51) Int. Cl.
*H01G 9/042* (2006.01)

(52) U.S. Cl. ........ 361/529; 361/523; 361/525; 361/528; 361/516; 361/519

(58) Field of Classification Search .................. 361/529, 361/523–528, 530–531, 516–519, 540–541, 361/502–504, 509–512; 29/25.01, 25.03
See application file for complete search history.

(56) References Cited

U.S. PATENT DOCUMENTS

| 5,638,253 | A  | * | 6/1997  | Hasegawa ............... 361/535 |
| 6,229,689 | B1 | * | 5/2001  | Kobayashi et al. ....... 361/525 |
| 6,392,869 | B2 | * | 5/2002  | Shiraishi et al. ......... 361/523 |
| 6,836,401 | B2 | * | 12/2004 | Yoshida et al. .......... 361/538 |
| 6,882,521 | B2 | * | 4/2005  | Tsutsui et al. ........... 361/523 |
| 6,909,596 | B2 | * | 6/2005  | Shimoyama et al. ...... 361/523 |
| 6,920,037 | B2 | * | 7/2005  | Sano et al. .............. 361/540 |
| 7,388,741 | B2 | * | 6/2008  | Konuma et al. .......... 361/528 |
| 2002/0001169 | A1 |  | 1/2002  | Shiraishi et al. |

FOREIGN PATENT DOCUMENTS

| EP | 1 160 809 A2 | 12/2001 |
| JP | 06-097009 A  | 4/1994 |
| JP | 2002-319522 A | 10/2002 |

* cited by examiner

*Primary Examiner* — Nguyen T Ha
(74) *Attorney, Agent, or Firm* — Sughrue Mion, PLLC

(57) ABSTRACT

The present invention relates to a capacitor chip and a solid electrolytic capacitor, wherein in a capacitor chip in which one or more capacitor element is laminated on a metal lead frame to carry electricity and the whole is encapsulated with resin, a laminated body is located within a certain definite range. The present invention enables to increase the capacitance of a capacitor by broadening the allowable range of the total thickness of the laminated capacitor chips without generating defective appearance of the laminated solid electrolytic capacitor.

9 Claims, 1 Drawing Sheet

CAPACITOR CHIP AND METHOD FOR MANUFACTURING SAME

CROSS-REFERENCE TO RELATED APPLICATIONS

This is an application filed pursuant to 35 U.S.C. Section 111(a) with claiming the benefit of U.S. Provisional application Ser. No. 60/752,045 filed Dec. 21, 2005 under the provision of 35 U.S.C. Section 111(b), pursuant to 35 U.S.C. Section 119(e)(1).

TECHNICAL FIELD

The present invention relates to a capacitor chip and a method for producing the same, particularly to a laminated solid electrolytic capacitor and a method for producing the same.

BACKGROUND ART

Recently, with developments on digitalization of electric devices and downsized and higher-speed electronic devices such as personal computers, capacitors, downsized but having large capacitance and low impedance in a high-frequency region, are demanded, and there have been proposed solid electrolytic capacitors using electroconductive polymer having electron conductivity as solid electrolyte. Particularly, since products having a larger capacitance are demanded, laminated solid electrolytic capacitors have been produced which are obtained by laminating a plurality of capacitor chips and encapsulating them.

For example, JP-A-2002-319522 (Patent Document 1; EP 1 160 809) discloses a solid electrolytic capacitor which reduces the size and increases the capacitance by downsizing the space required for electric integration of the anode body, and further enables to attain reliable electrical connection between the anode bodies with low resistance.

FIG. 1 is a cross-sectional view showing a structure of a conventional laminated solid electrolytic capacitor.

Generally, a solid electrolytic capacitor element (6) is produced by forming an oxide film layer of a dielectric body (2) on a surface of an anode substrate (1) consisting of a metal foil or a thin sheet having a large specific surface area increased by etching treatment and, generally, after further providing a masking layer (5) thereto, forming sequentially thereon a solid semiconductor layer (3) (hereinafter referred to as solid electrolyte) serving as a cathode part and a conductor layer (4) of electroconductive paste or the like. By laminating a plurality of thus-produced capacitor elements (6) unidirectionally, providing a conductor layer (4) as appropriate, further adding electrode lead parts (6, 7) and by encapsulating the whole by resin (9), a laminated solid electrolytic capacitor is produced.

In a laminated solid electrolytic capacitor, the capacitance of the capacitor can be increased by increasing the thickness and the number of the capacitor elements (6) to be laminated. However, when the total thickness of the laminated elements increases, the capacitor elements become readily exposed from the encapsulating resin or defects in appearance such as a pinhole or a weld line in the resin encapsulating the capacitor chip are likely to occur. Therefore there has been a problem of the limitation on the total thickness of the laminated capacitor elements.

Patent Document 1: JP-A-2002-319522

Problems to be Solved by the Invention

An object of the present invention is to provide a technology to increase the capacitance of a capacitor by broadening the allowable range of the total thickness of the laminated capacitor elements without generating defective appearance of the laminated solid electrolytic capacitor.

Means to Solve the Problem

As a result of intensive studies to solve the above-mentioned problem, the present inventors have found that, in a capacitor chip in which one or more capacitor element is laminated on a metal lead frame to carry electricity out of the capacitor chip and the whole is encapsulated with resin, locating the laminated body within a certain definite range causes few defects in appearance even if the thickness of the laminated body increases.

The present invention relates to a capacitor chip and a method for producing the same, particularly to a laminated solid electrolytic capacitor and a method for producing the same as follows:

1. In a capacitor chip obtained by laminating capacitor elements on one or both sides of a lead frame and encapsulating the resulting laminated body with resin, when Hs, Hc, Dt and Db respectively represents the thickness of the laminated body in a capacitor chip, the thickness of the capacitor chip, the minimum distance from the top of the laminated body to the upper surface of the encapsulating resin and the minimum distance from the bottom of the laminated body to the bottom surface of the encapsulating resin, a capacitor chip in which Hc minus Hs (Hc−Hs) is 0.1 mm or more, Dt/Db is 0.1 to 9, and both of Dt and Db are 0.02 mm or more.

2. The capacitor chip as described in 1 above, wherein Hc minus Hs (Hc−Hs) is 0.3 mm or more.

3. The capacitor chip as described in 2 above, wherein Hc minus Hs (Hc−Hs) is 0.6 mm or more.

4. The capacitor chip as described in any one of 1 to 3 above, wherein Dt/Db is 0.2 to 6.

5. The capacitor chip as described in any one of 1 to 3 above, wherein Dt/Db is 0.2 to 0.7 or 1.5 to 5.

6. The capacitor chip as described in any one of 1 to 5 above, which is a laminated capacitor chip in which two or more capacitor elements are laminated on at least one side of a lead frame.

7. A solid electrolytic capacitor using the capacitor chip described in any one of 1 to 6 above, wherein the capacitor element containing an anode body comprising valve-acting metal is a solid electrolytic capacitor element comprising an oxide film layer which is a dielectric layer and a solid electrolyte layer which is a cathode layer formed on a part of the surface of the valve-acting metal.

8. The solid electrolytic capacitor as described in 7 above, wherein the valve-acting metal is selected from metal mainly comprising any of magnesium, silicon, aluminum, zirconium, titanium, tantalum, niobium and hafnium, and alloy thereof.

9. In a method for producing a capacitor chip obtained by laminating capacitor elements on one or both sides of a lead frame and encapsulating the resulting laminated body with resin, when Hs, Hc, Dt and Db respectively represents the thickness of the laminated body in a capacitor chip, the thickness of the capacitor chip, the minimum distance from the top of the laminated body to the upper surface of the encapsulating resin and the minimum distance from the bottom of the laminated body to the bottom surface of the encapsulating resin, a method for producing a capacitor chip in which Hc minus Hs (Hc−Hs) is 0.1 mm or more, Dt/Db is 0.1 to 9, and both of Dt and Db are 0.02 mm or more.

The present invention enables to produce a laminated solid electrolytic capacitor having high capacitance without defect appearance. The present invention is applicable to capacitor chips in general.

Hereinafter, the capacitor chip of the present invention, particularly a laminated solid electrolytic capacitor, which is a preferred embodiment of the present invention, will be described concretely with reference to drawings.

FIG. 2 is a cross-sectional view of a capacitor chip (laminated solid electrolytic capacitor) in a preferred embodiment of the present invention.

In a capacitor chip, in which one or more capacitor element (s) (6) is laminated on a metal lead frame (11) in order to apply voltage to the capacitor chip, encapsulated with encapsulating resin (9), when Hs, Hc, Dt and Db respectively represents the total thickness of the laminated elements (6) and the lead frame (11), the thickness of the capacitor chip after encapsulation excluding the protrusions such as a glue pad (10), the minimum distance from the top of the laminated body to the upper surface of the encapsulating resin, and the minimum distance from the bottom of the laminated body to the bottom surface of the encapsulating resin excluding the protrusions such as a glue pad, the capacitor chip of the present invention is characterized in that Hc minus Hs (Hc−Hs) is 0.1 mm or more, Dt/Db is 0.1 to 9, and both of Dt and Db is 0.02 mm or more.

That is, the present invention is to solve the problem of defect appearance by locating the laminated body comprising capacitor elements and a lead frame in an encapsulated body within a certain definite range.

Hc minus Hs (Hc−Hs, which equals to Dt+Db) is adjusted to 0.1 mm or more as mentioned above. When Hc−Hs is less than 0.1 mm, it will cause defect appearance. Though it may vary depending on purposes and usage, Hc−Hs is preferably 0.3 mm or more, more preferably 0.6 mm or more, in a case where a thickness to a certain extent is allowable. The maximum value of Hc−Hs is not limited, but since Hc−Hs is a thickness which does not contribute to the capacitor capacitance, it is generally 5 mm or less, preferably 2 mm or less, more preferably 1 mm or less in order to secure larger capacitance per unit volume.

Dt/Db is regulated within a range from 0.1 to 9 as mentioned above. Dt/Db may be within the above range when Hc−Hs is relatively large (for example, 0.6 mm or more), but Dt/Db is preferably close in value to 1, for example, 0.2 to 6, more preferably 0.3 to 3 when Hc−Hs is relatively small (for example, less than 0.6 mm).

When Dt/Db exceeds a certain range, it is presumed that it will cause imbalance of the inflow velocity of the resin on the upper surface and the bottom surface of the laminated body at the time of encapsulating with resin. For example, when Dt>Db, there is a small distance between the bottom surface of the laminated body and the encapsulating mold, and the inflow velocity of the resin at the time of encapsulating becomes higher than that on the upper surface of the laminated body, and it is assumed that the element is subjected to stress corresponding to the inflow velocity. It is considered that the stress does not affect the leak current while Dt/Db is low, but when Db/Dt exceeds a certain value, the stress will affect the leak current. It is the same in the case when Dt<Db. The above-mentioned mechanism was considered based on the results of the present invention, and had not been anticipated before the present invention. The present invention is not to be considered limited by whether the invention is based on the above mechanism or not.

Both of Dt and Db are preferably 0.02 mm or more from the viewpoint of humidity resistance. Dt and Db are preferably 5 mm or less, more preferably 2 mm or less, even more preferably 1 mm or less, from the standpoint of securing capacitance per unit volume.

Both of Dt and Db are the thickness of a resin layer excluding the above-mentioned auxiliary parts for mounting such as a glue pad (10 in FIG. 2) and mounted electrodes (anode lead part 7 and cathode lead part 8 in the same figure) among the thickness of a capacitor chip.

Solid Electrolytic Capacitor Element:

The capacitor element (6) is not particularly limited as long as it can be laminated and may have a shape of a plate, a rod, a line, and preferably is an element having a shape of a mostly-flat plate; for example, a foil or a thin plate. Typically, it is a capacitor element having an oxide film layer (2) on an anode substrate (1) and a solid electrolyte layer (3) formed thereon as in FIGS. 1 and 2.

Valve-Acting Metal:

The valve-acting metal which is used in the present invention is metal mainly comprising any of magnesium, silicon, aluminum, zirconium, titanium, tantalum, niobium and hafnium, and an alloy thereof. It may be a porous body of each metal. The morphology of the porous material may be any of a porous shaped body such as an etched product of a rolled foil and a sintered body of fine powder.

The shape of the anode substrate (1) includes a plate-like foil, a board and a rod.

The thickness of the anode substrate varies depending on, for example, the use end, but a foil having a thickness of about 40 to 300 μm is usually used. In order to produce a thin solid electrolytic capacitor, in the case of a metal (e.g. aluminum) foil, it is preferred to use a foil having a thickness of 80 to 250 μm.

The size and the shape of the metal foil also vary depending on the use end, but the metal foil preferably has, in terms of a plate-like element unit, a rectangular shape with a width of approximately from 1 to 50 mm and a length of approximately from 1 to 50 mm, more preferably a width of approximately from 2 to 15 mm and a length of approximately from 2 to 25 mm.

Oxide Film Layer:

The oxide film layer (2) can be obtained by subjecting the above anode substrate (1) to chemical formation.

The dielectric film layer provided on the surface of the anode substrate may be an oxide layer of the valve-acting metal on the surface of which the oxide layer is provided or may be another dielectric layer provided on the surface of the valve-acting metal foil. However, particularly, the dielectric film layer is preferably a layer comprising an oxide of the valve-acting metal.

Solid Electrolyte:

Next, a solid electrolyte layer (3) is formed on the dielectric film layer of the cathode part. The kind of the solid electrolyte layer is not particularly limited and conventionally known solid electrolyte can be used. A solid electrolytic capacitor produced using highly-conductive polymer as solid electrolyte is particularly preferable since it has a lower amount of components which may cause an increase in equivalent series resistance, high capacitance in a small size and excellent high-frequency property compared to a wet electrolytic capacitor using a conventional electrolytic solution or a solid electrolytic capacitor using dioxide manganese.

A conductor layer (not shown in a figure) may be provided on the solid electrolyte (3) as required. The electrically conducting layer is formed, for example, by coating an electrically conducting paste, applying plating or vapor deposition, or applying an electrically conducting resin film. A masking (5) may be provided for ensuring the insulation of the solid electrolyte (3) (cathode part) from the metal substrate (1) (anode part).

Method for Producing a Laminated Solid Electrolytic Capacitor:

The laminated solid electrolytic capacitor in the preferred embodiment of the present invention can be produced by a process comprising a step of laminating solid electrolytic capacitor elements (6) on a lead frame (11) (a step may be provided below the bottom surfaces of the cathode part and the anode part) or a step of fixing a laminated body of solid electrolytic capacitor elements (6) on a lead frame (11) and then encapsulating the entirety with resin while leaving at least a part of both of the cathode lead part (8) and the anode lead part (7) of the lead frame (11) exposed.

Generally, the solid electrolytic capacitor elements (6) are laminated on a lead frame (11) having a plurality of cathode lead parts (8) and a plurality of anode lead parts (7) oppositely disposed across a gap so that each of the elements is placed on the cathode lead part (8) and the anode lead part (7), or a previously laminated body of the solid electrolytic capacitor elements is fixed on the lead frame.

In this case, the laminated anode part and the laminated cathode part is electrically connected with the anode lead part (7) and the cathode lead part (8), respectively. As shown in FIG. 2, a conductor layer/member (4) may be provided at the end face of the anode substrate.

The capacitor element (6) is generally laminated so that the cathode part and the anode part of one element are placed upon the cathode part and the anode part of another capacitor element, respectively.

For laminating the cathode part of one element on the cathode part of another capacitor element, a method for connecting the both electrically can be arbitrarily selected from, for example, lamination using electroconductive paste, soldering and welding. Also, a laminated body of the solid electrolytic capacitor elements can be fixed on the lead frame (11) in the same way.

In FIG. 2, the lead part is formed using a lead frame (11) and the laminated body of the capacitor elements (6) are provided thereon. The anode lead part may be extracted from the lateral side of the capacitor as in FIG. 1.

Furthermore, while the cathode lead part is provided between the laminated bodies in FIG. 2, the lead part of both of the cathode and the anode may be provided upon or under the laminated body (i.e. one or more solid electrolytic capacitor element (6) may be provided on one side of the lead part).

Next, the laminated structure of the capacitor elements (the lead frame comprising a laminated body of the capacitor elements) is encapsulated with resin leaving the portion of the cathode lead part and the anode lead part to be exposed, and after the resin is cured, the produced capacitor is cut off from the outer frame of the lead frame (not shown in figures) at its side edge.

Encapsulating Resin:

Encapsulation with resin is performed by an arbitrary method commonly used in the field for the purpose of protecting the capacitor element in the usage environment. For example, cast molding, compression molding and injection molding may be taken, and among the cast molding, transfer molding comprising a multi-plunger using a plurality of pots is preferable.

While any resin can be suitably used for encapsulation as long as it possesses heat resistance sufficient to resist the soldering heat at the time of mounting parts and is liquid at room temperature or when heated as appropriate, epoxy resin, which is frequently used from the viewpoint of humidity resistance and insulation properties is preferably used.

Epoxy resin can be used without limit as long as it is liquid and can be used for the purpose of encapsulation. The examples of the resin include liquid-form o-cresol novolac epoxy resin, biphenyl epoxy resin, dicyclopentadiene epoxy resin, bisphenol epoxy resin, bromine-containing epoxy resin and epoxy resin having a naphthalene skeleton.

EXAMPLES

Hereinafter, examples of the present invention are presented. It should be noted that these examples are merely exemplary and the present invention should not be construed as being limited thereto.

Example 1

An aluminum foil (thickness: 100 μm) was cut into a size of 3 mm (in the short axis direction)×10 mm (in the long axis direction), and a polyimide solution was circumferentially coated on both surfaces in a width of 1 mm to divide the surface into a 4-mm portion and a 5-mm portion in the long axis direction and then dried to provide a masking. A voltage of 4 V was applied to the 3 mm×4 mm portion of this chemically formed foil in a 10 mass % aqueous ammonium adipate solution to chemically form the cut end part and thereby produce a dielectric oxide film. Thereafter, this 3 mm×4 mm portion of the aluminum foil was dipped in an isopropyl alcohol (IPA) solution containing 25 mass % of 3,4-ethylenedioxythiophene for 10 seconds and after drying at room temperature for 10 minutes, dipped in a 1 mol/L aqueous ammonium persulfate solution adjusted to have a sodium 2-anthraquinonesulfonate concentration of 0.05 mass % for 10 seconds. Subsequently, this aluminum foil was left standing at a temperature of 40° C. for 30 minutes to effect oxidative polymerization. These impregnation step and polymerization step as a whole were repeated 12 times, whereby a solid electrolyte layer of an electrically conducting polymer was formed on the outer surface of the aluminum foil.

The finally produced poly(3,4-ethylenedioxythiophene) was washed with purified water and then dried at 100° C. for 30 minutes to complete the formation of the solid electrolyte layer.

Thereafter, the 3 mm×4 mm portion having formed thereon a solid electrolyte layer was dipped in a 15 mass % aqueous ammonium adipate solution and by providing an anode contact point on the valve-acting metal foil in the portion where the solid electrolyte layer was not formed, a voltage of 3.8 V was applied to effect re-chemical formation.

Next, the valve-acting metal foil was coated with a carbon paste and a silver paste thereby to produce an element. Using a film thickness meter (produced by Peacock Co., Ltd., Digital Dial Gauge DG-205, accuracy of 3 μm), the element was slowly pressed between the measuring parts of the film thickness meter for measuring the thickness. The average film thickness was 0.25 mm.

Two of the resulting capacitor elements were laminated on the upper surface of a metal lead frame 0.1 mm thick and one element was stacked on the bottom surface, thereby producing a laminated capacitor element having a thickness of 0.85 mm including the lead frame.

The element was encapsulated with epoxy resin so as to make the distance from the upper surface of the laminated layers to the upper surface of the encapsulating resin to 0.35 mm and the distance from the bottom surface of the laminated layers to the bottom surface of the encapsulating resin excluding a glue pad to 0.5 mm to thereby produce 100 units of capacitor chips. The capacitor chips were subjected to aging at 105° C. for two hours by applying a rated voltage (2 V) to produce 100 units of the capacitors in total.

The capacitors underwent an appearance inspection after the encapsulation and those which had a whole 0.05 mm wide or more, an exposed laminated element, or a crack of 0.05 mm wide or more in the encapsulating resin were determined to be defective in appearance. The results are shown in Table 1. With respect to these 100 units of the capacitors, the capacitance and loss factor (tan δ×100(%)) at 120 Hz, the equivalent series resistance (ESR) and the leakage current were measured as initial properties. The leakage current was measured one minute after the rated voltage was applied. These measured values each in terms of an average value and the defective ratio assuming that the capacitor with a leakage current of 0.002 CV or more is defective, are shown in Table 2. The average value of the leakage current is a value calculated by excluding defectives.

Example 2

By laminating three of the capacitor elements 0.25 mm thick produced in Example 1 on the upper surface of the metal lead frame 0.1 mm thick and two of the elements on the bottom surface, a laminated capacitor element was produced which was 1.35 mm thick including the lead frame.

100 units of the capacitor chips 1.7 mm thick excluding a glue pad were produced in the same way as in Example 1 except that the distance from the upper surface of the laminated layers to the upper surface of the encapsulating resin was set to 0.15 mm and the distance from the bottom surface of the laminated layers to the bottom surface of the encapsulating resin excluding a glue pad to 0.2 mm. The capacitor chips were subjected to an appearance inspection and measurement of the capacitor properties in the same way as in Example 1. The results are shown in Tables 1 and 2.

Example 3

By laminating two of the capacitor elements 0.25 mm thick produced in Example 1 on the upper surface of the metal lead frame 0.1 mm thick and two of the elements on the bottom surface, a laminated capacitor element was produced which was 1.1 mm thick including the lead frame.

100 units of the capacitor chips 1.7 mm thick excluding a glue pad were produced in the same way as in Example 1 except that the distance from the upper surface of the laminated layers to the upper surface of the encapsulating resin was set to 0.3 mm and the distance from the bottom surface of the laminated layers to the bottom surface of the encapsulating resin excluding a glue pad to 0.3 mm. The capacitor chips were subjected to an appearance inspection and measurement of the capacitor properties in the same way as in Example 1. The results are shown in Tables 1 and 2.

Example 4

By laminating three of the capacitor elements 0.25 mm thick produced in Example 1 on the upper surface of the metal lead frame 0.1 mm thick and one of the elements on the bottom surface, a laminated capacitor element was produced which was 1.1 mm thick including the lead frame.

100 units of the capacitor chips 1.7 mm thick excluding a glue pad were produced in the same way as in Example 1 except that the distance from the upper surface of the laminated layers to the upper surface of the encapsulating resin was set to 0.1 mm and the distance from the bottom surface of the laminated layers to the bottom surface of the encapsulating resin excluding a glue pad to 0.5 mm. The capacitor chips were subjected to an appearance inspection and measurement of the capacitor properties in the same way as in Example 1. The results are shown in Tables 1 and 2.

Example 5

By laminating three of the capacitor elements 0.25 mm thick produced in Example 1 on the upper surface of the metal lead frame 0.1 mm thick and two of the elements on the bottom surface, a laminated capacitor element was produced which was 1.35 mm thick including the lead frame.

100 units of the capacitor chips 1.7 mm thick excluding a glue pad were produced in the same way as in Example 1 except that the distance from the upper surface of the laminated layers to the upper surface of the encapsulating resin was set to 0.1 mm and the distance from the bottom surface of the laminated layers to the bottom surface of the encapsulating resin excluding a glue pad to 0.25 mm. The capacitor chips were subjected to an appearance inspection and measurement of the capacitor properties in the same way as in Example 1. The results are shown in Tables 1 and 2.

Example 6

By laminating three of the capacitor elements 0.25 mm thick produced in Example 1 on the upper surface of the metal lead frame 0.1 mm thick and one of the elements on the bottom surface, a laminated capacitor element was produced which was 1.1 mm thick including the lead frame.

100 units of the capacitor chips 1.7 mm thick excluding a glue pad were produced in the same way as in Example 1 except that the distance from the upper surface of the laminated layers to the upper surface of the encapsulating resin was set to 0.12 mm and the distance from the bottom surface of the laminated layers to the bottom surface of the encapsulating resin excluding a glue pad to 0.48 mm. The capacitor chips were subjected to an appearance inspection and measurement of the capacitor properties in the same way as in Example 1. The results are shown in Tables 1 and 2.

Example 7

By laminating one of the capacitor elements 0.25 mm thick produced in Example 1 on the upper surface of the metal lead frame 0.1 mm thick and three of the elements on the bottom surface, a laminated capacitor element was produced which was 1.1 mm thick including the lead frame.

100 units of the capacitor chips 1.7 mm thick excluding a glue pad were produced in the same way as in Example 1 except that the distance from the upper surface of the laminated layers to the upper surface of the encapsulating resin was set to 0.52 mm and the distance from the bottom surface of the laminated layers to the bottom surface of the encapsulating resin excluding a glue pad to 0.08 mm. The capacitor chips were subjected to an appearance inspection and measurement of the capacitor properties in the same way as in Example 1. The results are shown in Tables 1 and 2.

Example 8

By laminating three of the capacitor elements 0.29 mm thick produced in Example 1 on the upper surface of the metal lead frame 0.1 mm thick and two of the elements on the bottom surface, a laminated capacitor element was produced which was 1.55 mm thick including the lead frame.

100 units of the capacitor chips 1.7 mm thick excluding a glue pad were produced in the same way as in Example 1 except that the distance from the upper surface of the laminated layers to the upper surface of the encapsulating resin was set to 0.10 mm and the distance from the bottom surface of the laminated layers to the bottom surface of the encapsulating resin excluding a glue pad to 0.05 mm. The capacitor chips were subjected to an appearance inspection and measurement of the capacitor properties in the same way as in Example 1. The results are shown in Tables 1 and 2.

Comparative Example 1

By laminating three of the capacitor elements 0.25 mm thick produced in Example 1 on the upper surface of the metal lead frame 0.1 mm thick and two of the elements on the bottom surface, a laminated capacitor element was produced which was 1.35 mm thick including the lead frame.

100 units of the capacitor chips 1.7 mm thick excluding a glue pad were produced in the same way as in Example 1 except that the distance from the upper surface of the laminated layers to the upper surface of the encapsulating resin was set to 0.32 mm and the distance from the bottom surface of the laminated layers to the bottom surface of the encapsulating resin excluding a glue pad to 0.03 mm. The capacitor chips were subjected to an appearance inspection and measurement of the capacitor properties in the same way as in Example 1. The results are shown in Tables 1 and 2.

Comparative Example 2

By laminating three of the capacitor elements 0.30 mm on the upper surface of the metal lead frame 0.1 mm thick and two of the elements on the bottom surface, a laminated capacitor element was produced which was 1.60 mm thick including the lead frame.

100 units of the capacitor chips 1.7 mm thick excluding a glue pad were produced in the same way as in Example 1 except that the distance from the upper surface of the laminated layers to the upper surface of the encapsulating resin was set to 0.09 mm and the distance from the bottom surface of the laminated layers to the bottom surface of the encapsulating resin excluding a glue pad to 0.01 mm. The capacitor chips were subjected to an appearance inspection and measurement of the capacitor properties in the same way as in Example 1. The results are shown in Tables 1 and 2.

Comparative Example 3

By laminating three of the capacitor elements 0.26 mm on the upper surface of the metal lead frame 0.1 mm thick and three of the elements on the bottom surface, a laminated capacitor element was produced which was 1.66 mm thick including the lead frame.

100 units of the capacitor chips 1.7 mm thick excluding a glue pad were produced in the same way as in Example 1 except that the distance from the upper surface of the laminated layers to the upper surface of the encapsulating resin was set to 0.02 mm and the distance from the bottom surface of the laminated layers to the bottom surface of the encapsulating resin excluding a glue pad to 0.02 mm. The capacitor chips were subjected to an appearance inspection and measurement of the capacitor properties in the same way as in Example 1. The results are shown in Tables 1 and 2.

TABLE 1

|  | Hc − Hs | Dt | Db | Dt/Db | Number of defective units in appearance |
|---|---|---|---|---|---|
| Example 1 | 0.85 mm | 0.35 mm | 0.50 mm | 0.70 | 0 |
| Example 2 | 0.35 mm | 0.15 mm | 0.20 mm | 0.75 | 0 |
| Example 3 | 0.60 mm | 0.30 mm | 0.30 mm | 1.00 | 0 |
| Example 4 | 0.60 mm | 0.10 mm | 0.50 mm | 0.20 | 0 |
| Example 5 | 0.35 mm | 0.10 mm | 0.25 mm | 0.40 | 0 |
| Example 6 | 0.60 mm | 0.12 mm | 0.48 mm | 0.25 | 0 |
| Example 7 | 0.60 mm | 0.52 mm | 0.08 mm | 6.50 | 0 |
| Example 8 | 0.15 mm | 0.10 mm | 0.05 mm | 2.00 | 3 |
| Comparative Example 1 | 0.35 mm | 0.32 mm | 0.03 mm | 10.70 | 45 |
| Comparative Example 2 | 0.10 mm | 0.09 mm | 0.01 mm | 9.00 | 69 |
| Comparative Example 3 | 0.04 mm | 0.02 mm | 0.02 mm | 1.00 | 87 |

TABLE 2

|  | Capacitance μF | Tan δ % | ESR Ω | Leak current μA | Number of defective units |
|---|---|---|---|---|---|
| Example 1 | 80 | 1.2 | 0.012 | 0.35 | 0/100 |
| Example 2 | 130 | 1.0 | 0.007 | 0.40 | 0/100 |
| Example 3 | 105 | 1.1 | 0.009 | 0.37 | 0/100 |
| Example 4 | 106 | 1.3 | 0.009 | 0.55 | 20/100 |
| Example 5 | 132 | 1.0 | 0.007 | 0.40 | 0/100 |
| Example 6 | 105 | 1.4 | 0.009 | 0.38 | 0/100 |
| Example 7 | 106 | 1.6 | 0.009 | 0.65 | 32/100 |
| Example 8 | 130 | 1.2 | 0.007 | 0.50 | 12/100 |
| Comparative Example 1 | 132 | 1.7 | 0.012 | 0.77 | 44/100 |
| Comparative Example 2 | 131 | 1.6 | 0.016 | 0.98 | 53/100 |
| Comparative Example 3 | 155 | 1.5 | 0.020 | 1.03 | 71/100 |

As seen in the results, the laminated solid electrolytic capacitors produced in the Examples of the present invention has apparently fewer defects in appearance compared with those produced in the Comparative Examples.

INDUSTRIAL APPLICABILITY

The present invention enables to produce laminated solid electrolytic capacitors having fewer defects in appearance and high capacitance. Consequently, the capacitors and the method for producing the same of the present invention are effective in producing a wide variety of laminated capacitors.

EXPLANATION OF REFERENCE NUMBERS

Figure 1:
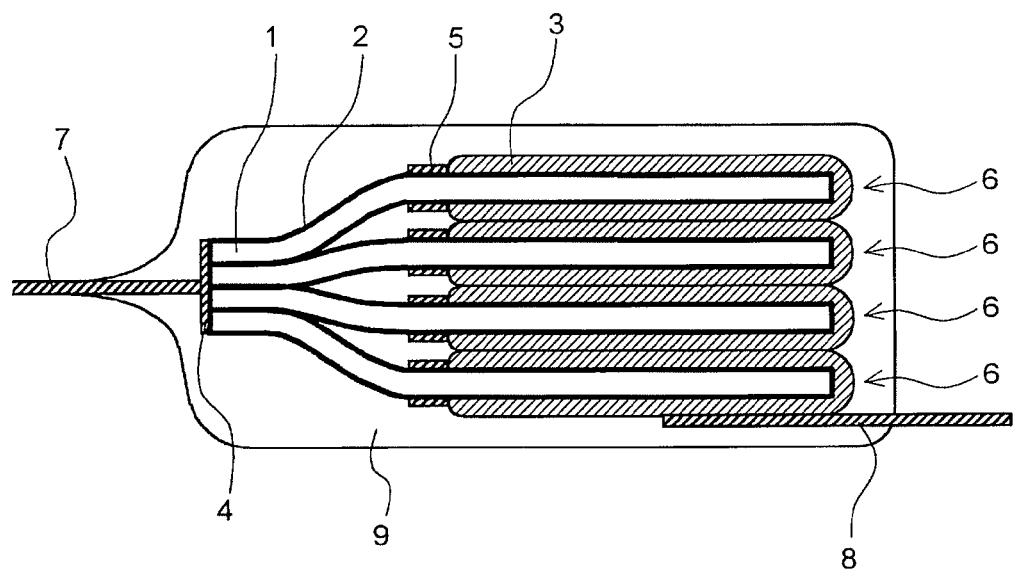
FIG. 1 A cross-sectional view showing a general structure of a conventional laminated solid electrolytic capacitor element FIG. 2 A cross-sectional view showing the structure of the laminated solid electrolytic capacitor element of the present invention
Figure 2:
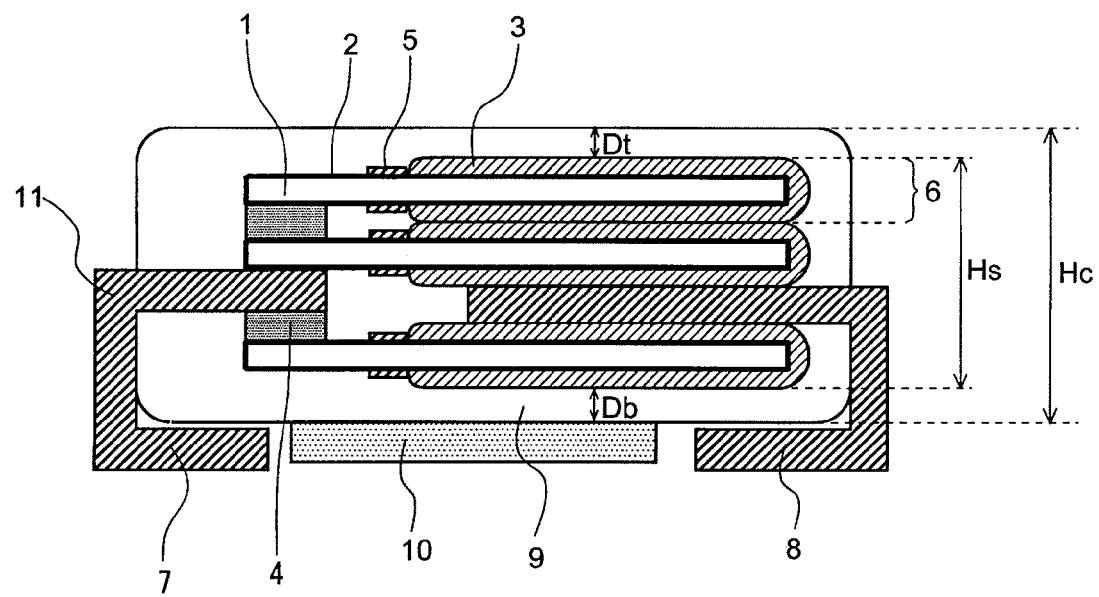

1 anode substrate
2 oxide film layer
3 solid electrolyte layer
4 conductor layer
5 masking
6 capacitor element

7 anode lead part
8 cathode lead part
9 encapsulating resin
10 glue pad
11 metal lead frame

The invention claimed is:

1. In a capacitor chip obtained by laminating capacitor elements on one or both sides of a lead frame and encapsulating the resulting laminated body with resin, when Hs, Hc, Dt and Db respectively represents the thickness of the laminated body in a capacitor chip, the thickness of the capacitor chip, the minimum distance from the top of the laminated body to the upper surface of the encapsulating resin and the minimum distance from the bottom of the laminated body to the bottom surface of the encapsulating resin, a capacitor chip in which Hc minus Hs (Hc−Hs) is 0.1 mm or more, Dt/Db is 0.1 to 9, and both of Dt and Db are 0.02 mm or more.

2. The capacitor chip as claimed in claim 1, wherein Hc minus Hs (Hc−Hs) is 0.3 mm or more.

3. The capacitor chip as claimed in claim 2, wherein Hc minus Hs (Hc−Hs) is 0.6 mm or more.

4. The capacitor chip as claimed in claim 1, wherein Dt/Db is 0.2 to 6.

5. The capacitor chip as claimed in claim 1, wherein Dt/Db is 0.2 to 0.7 or 1.5 to 5.

6. The capacitor chip as claimed in claim 1, which is a laminated capacitor chip in which two or more capacitor elements are laminated on at least one side of a lead frame.

7. The capacitor chip as claimed in claim 1, wherein the capacitor element containing an anode body comprising valve-acting metal is a solid electrolytic capacitor element comprising an oxide film layer which is a dielectric layer and a solid electrolyte layer which is a cathode layer formed on a part of the surface of the valve-acting metal.

8. The capacitor chip as claimed in claim 7, wherein the valve-acting metal is selected from metal mainly comprising any of magnesium, silicon, aluminum, zirconium, titanium, tantalum, niobium and hafnium, and alloy thereof.

9. In a method for producing a capacitor chip obtained by laminating capacitor elements on one or both sides of a lead frame and encapsulating the resulting laminated body with resin, when Hs, Hc, Dt and Db respectively represents the thickness of the laminated body in a capacitor chip, the thickness of the capacitor chip, the minimum distance from the top of the laminated body to the upper surface of the encapsulating resin and the minimum distance from the bottom of the laminated body to the bottom surface of the encapsulating resin, a method for producing a capacitor chip in which Hc minus Hs (Hc−Hs) is 0.1 mm or more, Dt/Db is 0.1 to 9, and both of Dt and Db are 0.02 mm or more.

* * * * *